United States Patent [19]

Landën

[11] 4,144,770

[45] Mar. 20, 1979

[54] THROTTLE-VALVE CONTROL

[75] Inventor: Göte G. V. Landën, Huskvarna, Sweden

[73] Assignee: Husqvarna AB, Huskvarna, Sweden

[21] Appl. No.: 789,708

[22] Filed: Apr. 21, 1977

[30] Foreign Application Priority Data

Apr. 22, 1976 [SE] Sweden ................................ 7604628

[51] Int. Cl.[2] ............................................ F16H 21/18

[52] U.S. Cl. ..................................... 74/47; 180/64 R; 261/65

[58] Field of Search ............................ 261/65; 74/47; 180/64 R, 77 R

[56] References Cited

U.S. PATENT DOCUMENTS

| | | | |
|---|---|---|---|
| 2,809,623 | 10/1957 | Hall | 261/65 |
| 3,870,117 | 3/1975 | Larsen | 180/64 R |
| 3,943,206 | 3/1976 | Schubeck | 261/65 |
| 3,958,654 | 5/1976 | LeSalver | 180/64 R |

*Primary Examiner*—Benjamin W. Wyche
*Assistant Examiner*—Wesley S. Ratliff, Jr.
*Attorney, Agent, or Firm*—Holman & Stern

[57] ABSTRACT

The invention provides a throttle-valve control arrangement for an engine mounted by vibration dampers on a support structure. The arrangement insures that pivotal movements between the engine and the support structure about a pivot center do not effect the throttle-valve setting, by the use of a throttle-valve linkage incorporating a pair of interengaging levers having mutually contacting surfaces, one of which surfaces is curved and has a center of curvature situated on the pivot center between the engine and the support structure.

4 Claims, 2 Drawing Figures

THROTTLE-VALVE CONTROL

Figure 2:
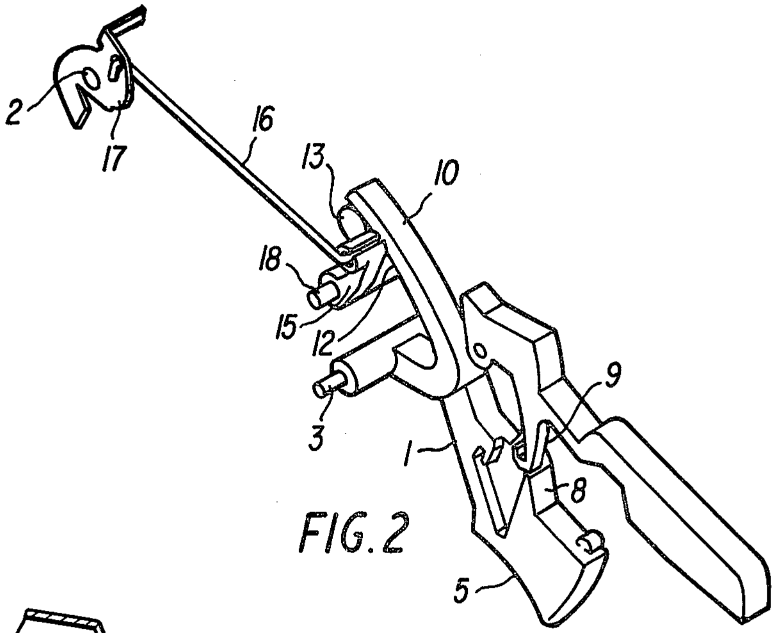

The present invention relates to a throttle-valve control arrangement for engines mounted in a frame, machine body, or like support structure by means of vibration-damping units.

Known devices for rotating the throttle-valve of an engine are normally in the form of a lever operating in conjunction with a cable, or a system of links. In this way throttle-setting movements can be transmitted to the pivot-shaft of the throttle-valve from a handle or other operating member of the machine. Owing to the fact that the engine is not rigidly connected to the frame, the engine is able to move relative to the frame, for example when the engine operates under load. Since the throttle lever is attached to the frame, or to a part associated therewith, and since the engine, together with its carburettor and throttle-valve, is displaced from its normal position in the frame as a result of said relative movement, a corresponding movement is transmitted to the throttle-valve via said lever, links etc, thereby causing the setting, possibly a pre-adjusted setting, of the throttle-valve to be changed. The machine operator must then correct the throttle setting by means of the throttle lever, either to the same setting as that which the throttle-valve had prior to said relative movement or to another setting considered suitable by the operator. When the engine operates under a varying load, it is frequently necessary to correct the setting of the throttle-valve, rendering it difficult for the operator to maintain constantly a suitable engine speed. Consequently there is a requirement for means whereby the throttle-valve can be maintained in a predetermined setting in those circumstances where the engine is able to move relative to its supporting frame.

According to the present invention, a throttle-valve control arrangement is characterized in that two levers one of which is for connection to the throttle lever and the other to the throttle valve, are each adapted to the journalled by means of a respective one of two substantially parallel shafts so as to provide mutually contacting surfaces which, on at least one of the levers, is curved about a centre of curvature which, when assembled, is located approximately at a pivot centre for specific relative pivotal movements between the engine and its support structure.

The present invention relates to a lever system arrangement for transmitting setting movements to a throttle-valve, which movements are unaffected by relative movement between the motor and its support structure. In this respect, the rotary movement required for the pivot shaft of the throttle-valve is a precise function of each change in position of the throttle lever effected by the machine operator. Elimination of the effect of the relative movement on the throttle-valve is achieved by compensating for a given pattern of such movements, which pattern is normally highly specific for each type of machine to which the invention is to be applied.

Figure 1:
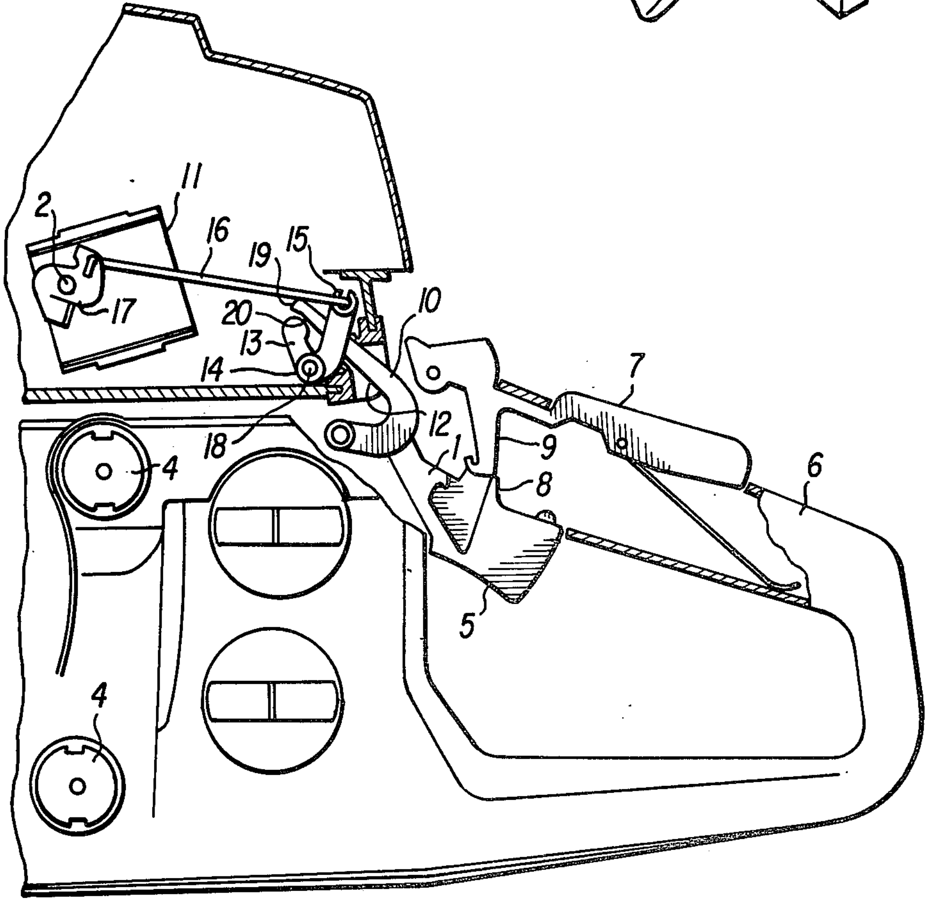

The following description of a preferred embodiment of the invention discloses how relative movements between an engine and its support frame are eliminated in the case of a motor saw, in which said relative movements have a particular specified pattern. The arrangement will now be described with reference to the accompanying drawings, in which:

FIG. 1 is a fragmentary, part sectional side view of the motor saw showing the elements of the lever-system arrangement, and FIG. 2 is a perspective view of said elements.

The lever-system arrangement is required to transmit rotary movement from an arm 1 to the pivot shaft 2 of the throttle-valve. The arm is mounted in the motor saw body by means of a shaft 3, the motor (not shown) being resiliently suspended by means of rubber vibration-damping units 4. The outer end of the arm 1 is provided with a finger grip 5 mounted in a handle 6 associated with said body. Also mounted in the handle is latching means 7 which, in the illustrated position, latches the arm 1 in a lower limit position due to engagement between a shoulder 8 on said arm and an opposing projection 9 on the latching means. The latch is released by depressing said latching means 7 relative to the handle so that the projection 9 slides past the shoulder 8, thereby enabling the arm 1 to be swung upwardly when pressure is exerted on the finger grip 5; this pivot movement of the arm is assisted by an angle lever 10 comprising an extension of the arm 1 and thus pivotal about the shaft 3. The undersurface 12 of the angle arm 10 abuts one limb 13 of an angled member 14, the other limb 15 of which is connected to a plate 17 through a link 16, said plate being connected to the pivot shaft 2 of the carburettor 11. Pivoting movement of the arm 1 is transmitted by a angle lever 10 to the angle member 14, which is journalled on a shaft 18, mounted on the motor and arranged approximately parallel with the shaft 3 mounted on the saw body, and further by the link 16 to the plate 17 and therewith to the shaft 2 of the throttle-valve. The plate is pivoted against the action of the return spring (not shown), which biasses the throttle-valve, and therewith the arm 1, to the lower limit position.

As previously mentioned, the body and the motor are separated by means of the rubber damping units 4. The angle member 14 and the lever 10 form a further connection between the body and the motor, i.e. when the underside 12 of the lever presses against the limb 13 of the angle member 14. In operation, the motor will move relative to the body, for example when the machine operator urges the motor or parts associated therewith (in this embodiment the saw sword) against a workpiece, whereupon the limb 13 will engage and slide against the undersurface 12. In previously known arrangements this would mean that a force will be applied to the limb 13 capable of changing the position of the throttle-valve without the arm 1 being activated. In the illustrated embodiment and in accordance with the invention the lever/angle member connection has been constructed and arranged to compensate for this undesired force, which force as a consequence is eliminated. The relative movement between the motor and the body takes place substantially in a plane parallel with the section in FIG. 1, the axial direction of the rubber units 4 being perpendicular to said plane so that the rubber units act in torsion to absorb relative movement. In this embodiment, the relative movement is a pivotal movement about an imaginary centre point of the motor. Thus, the end of the limb 13 describes a short circular arc during such pivotal movement, and the undersurface 12 of the lever must therefore present such a circular arc so that no moment of force occurs on the limb 13 when said limb slides against the undersurface. As will be evident from FIG. 1, the undersurface of the outer portion of the lever 10 is slightly curved, as shown at 19 and has a centre of curvature which lies approximately at said imaginary centre point of the motor; the slightly curved surface thus provides the circular arc on which the end of the limb 13 slides during said relative movement.

As shown in FIG. 1, the axes of the shafts 3 and 18 lie approximately on a line extending towards the abutment point 20 between the limb 13 and the angle lever 10. This means that the frictional force at this point is directed approximately long the longitudinal axis of the limb 13 and will thus not create a moment of force on said limb; this is particularly the case when the arm 1 is lifted slightly from the lower, illustrated limit position, i.e. the angle lever 10 is adjusted to a normal throttle setting. The limb 13 and the straight portion of the angle lever are approximately parallel in such position.

In this embodiment the pivot-damping units comprise cylinder elements 4 which are disposed around the engine, preferably in a rectangular array, in which case the centre of curvature of the curved surface portion 19 lies approximately at the centre of said rectangle. Also, the levers 10, 14 are preferably made of a synthetic resin material of a high surface uniformity and thus a low coefficient of friction at the contact point between the undersurface 12 and limb 13.

The illustrated arrangement of the limb 13 and the angle lever 10 and the curved portion 19 thereof excludes the possibility of a moment of force acting on the limb as a result of relative movement between the motor and the body. The arrangement is an example of how the problem of maintaining the trottle-valve in a predetermined position can be solved. It will also be observed that similar solutions can be provided with a modified arrangement; for example the angle member 14 can be replaced with a double-arm straight lever and the combined arm/lever 1, 10 for a single lever. Certain embodiments of the described arrangement can also be adapted to other patterns of relative movement than the aforementioned pivotal movement about an imaginary centre point. Such modifications to the arrangement of the invention and other variants are within the scope of the following claims.

What I claim is:

1. A throttle-valve control system for an engine mounted by oscillation damping means on a support structure, said engine and support structure being relatively pivotally moveable about a pivot center when the engine is in use, said arrangement comprising a pivotal throttle-valve, an operating member and a throttle-valve linkage of transmitting movement between said operating member and said throttle-valve, said throttle-valve linkage including a pair of interengaging levers pivoted on substantially parallel pivot shafts, said levers having mutually contacting surfaces through which movement is transmitted from one to the other of said levers on movement of said operating member, at least one of said surfaces being curved and having a center of curvature located substantially at said pivot center.

2. A throttle-valve control arrangement according to claim 1, characterized in that the two parallel shafts are so positioned that the location at which the two levers contact each other lies approximately on a line extending straight through the axes of said shafts.

3. A throttle-valve control arrangement according to claim 2, characterized in that the two levers are adapted for movement via the throttle lever to a position in which the levers are substantially parallel.

4. A throttle-valve control arrangement according to claim 1, characterized in that the levers are made of a synthetic resin material of a high surface uniformity and thus with a low coefficient of friction at the contact point between said levers.

* * * * *